(12) United States Patent
Monogioudis

(10) Patent No.: US 8,159,974 B2
(45) Date of Patent: Apr. 17, 2012

(54) METHOD OF CONFIGURING INTERFACES BETWEEN A PLURALITY OF COMMUNICATION NODES

(75) Inventor: Pantelis Monogioudis, Randolph, NJ (US)

(73) Assignee: Alcatel Lucent, Paris (FR)

( * ) Notice: Subject to any disclaimer, the term of this patent is extended or adjusted under 35 U.S.C. 154(b) by 273 days.

(21) Appl. No.: 12/656,070

(22) Filed: Jan. 15, 2010

(65) Prior Publication Data

US 2011/0176453 A1 Jul. 21, 2011

(51) Int. Cl.
*H04L 12/28* (2006.01)
*H04L 12/50* (2006.01)
*H04L 12/56* (2006.01)
*H04L 12/66* (2006.01)

(52) U.S. Cl. ......... 370/254; 370/359; 370/419; 370/463
(58) Field of Classification Search .................. 370/254, 370/359, 419, 463
See application file for complete search history.

(56) References Cited

U.S. PATENT DOCUMENTS 6,466,631 B1 * 10/2002 Schenk .......................... 375/346

* cited by examiner

*Primary Examiner* — Ronald Abelson
(74) *Attorney, Agent, or Firm* — Harness, Dickey & Pierce

(57) ABSTRACT

One embodiment includes monitoring, for each communication node, at least one factor of interest and a plurality of potential influencing factors associated with the factor of interest. The factor of interest characterizes an operating condition of the communication node, and the plurality of potential influencing factors each have a potential influence on the operating condition. For each factor of interest for each communication node, a predictor coefficient for one or more of the potential influencing factors associated with the factor of interest is determined. The predictor coefficient indicates a predicted level of influence the potential influencing factor has on the factor of interest. For each communication node, interfaces are configured between the communication node and other communication nodes based on the determined predictor coefficients.

17 Claims, 3 Drawing Sheets

| time | Factor of Interest Node W | Potential Influencing Factor 1 | ... | Potential Influencing Factor p |
|---|---|---|---|---|

*FIG. 3*

| $t_1$ | Interference at node W | Cell id node x | Cell id other node A1 | ... | Cell id other node AL | transmit Power other node A1 | ... | transmit Power other node AL |
|---|---|---|---|---|---|---|---|---|

METHOD OF CONFIGURING INTERFACES BETWEEN A PLURALITY OF COMMUNICATION NODES

BACKGROUND OF THE INVENTION

The interference management in wireless communication systems is central to the performance of the communication system and highly dependent on the specific air interface. While OFDMA transmissions will be discussed, similar considerations affect (W)CDMA systems with same cell interference $I_{sc}$ cancellation. Therefore for both (W)CDMA and precoded OFDMA, the dominant interference is other cell interference $I_{oc}$ that results from the transmissions to/from other users in adjacent cells. Lately, the notion of heterogeneous networks (HTN) was introduced that encompasses multiple stacked cell layers.

In the HTN deployment scenarios the notion that same cell interference is negligible must be revisited as the small cells are usually under the coverage of a larger macrocell and in general reuse macrocell resources with either hard or soft reuse patterns. Small cells may include picocells, femtocells, relay nodes and in general any node that defines explicitly or implicitly a new cell. Interference management is possible by controlling the transmit power spectral density of mobiles in the uplink (UL) and evolved Node-Bs (eNB) in the downlink (DL). Interference variability is dependent on many factors such as:

- The decorrelation length of the shadowing component. This defines how often the long-term channel will vary over time.
- The power control of interfering sources.
- The transmission times of the packets of the interfering sources as determined by the application (e.g., equal global quality of service (GoS or eGos), Best Effort, Streaming Video) or by the scheduler.
- The presence of any MIMO transmission schemes such as Closed Loop Multiuser MIMO (MU-MIMO) where resources are reused spatially.
- The diversity order of the interfering sources, which is a quantity that affects the degrees of freedom of interference and therefore its statistics. Diversity order may increase due to the MIMO mode used (SFBC), due to precoding or due to the specific resource allocation.

Controlling transmit power spectral density is based on the following capabilities:

- Each node (macro or small cell) explicitly or implicitly using the nearby UEs, measuring the other cell interference and exchanging this information within the Radio Access Network (RAN).
- Transmitting this information to a computing resource that can be part of a cloud computing architecture where further processing such as parameter inference, as well as interference information compression can take place.

In view of the above, and other concerns, numerous interfaces are established between the macro and/or small cells to convey the messages reporting the above described information.

FIG. 1 illustrates a portion of a conventional heterogeneous network (HTN) having multiple stacked cell layers. FIG. 1 shows the coverage area of a macro cell served by a macro base station 10 also called an evolved NodeB or eNodeB. As shown, the coverage area includes a network 15 of pico cells, each served by a pico base station 20 also called a pico evolved NodeB or pico eNodeB. User equipment (UE) 25 falls within the coverage area of one or more of the pico base stations 20 and therefore the coverage area of the macro base station 10. The communication needs of the UE may be served by one of the communication nodes—pico base stations 20 or macro base station 10. If served by a pico base station 20, the UE's traffic may traverse the pico network 15 (i.e., from pico eNodeB to pico eNodeB) to a gateway 40, and from the gateway 40 to other networks and/or the internet. Also, the UE's traffic may traverse the pico network 15 to the macro base station 10, and from the macro base station 10 to other networks and/or the internet. Still further, the UE's traffic may flow directly to and from the macro base station 10. As will be appreciated additional and/or different network layers may be present. For example, in addition to or instead of the pico network 15, a Femto network may exist or individual Femto cells may exist.

In today's networking architecture for small cells, a well-known X2 interface is established between the small cell of interest and each neighboring small cell. These X2 interfaces are called the intra-layer X2 interfaces. As shown in FIG. 1, this forms an X2 interface cloud among the pico base stations 20. Similarly, an X2 interface between the small cell of interest and each neighboring macrocell are set up. These X2 interfaces are called the inter-layer X2 interfaces. This is also shown in FIG. 1, with the macro base station 10 having N X2 interfaces with N pico base stations 20. The X2 interfaces carry information such as for managing interference from base station to base station. With the interference problem far worse in HTNs, exchanging information as described above to manage the interference problem becomes more critical. However, with field site-to-site distances for the 700 MHz band on the order of 2 km, for example, the number of potential small cells could be in the tens or even hundreds depending on their power levels and their associated coverage. As result, the number of X2 interfaces rapidly becomes very high.

SUMMARY OF THE INVENTION

The present invention relates to a method of configuring interfaces between a plurality of communication nodes.

In particular, the present invention relates to reducing interfaces in heterogeneous networks. Still further the present invention relates to reducing interfaces in heterogeneous networks (HTNs) while providing for scalability of the HTNs and/or maintaining dissemination of information to manage interference in the HTN. Additionally, the present invention relates to a method configuring interfaces that provides the flexibility required by autonomous planning and operation—the self-organization of the network (SON).

One embodiment includes monitoring, for each communication node, at least one factor of interest and a plurality of potential influencing factors associated with the factor of interest. The factor of interest characterizes an operating condition of the communication node, and the plurality of potential influencing factors each have a potential influence on the operating condition. For each factor of interest for each communication node, a predictor coefficient for one or more of the potential influencing factors associated with the factor of interest is determined. The predictor coefficient indicates a predicted level of influence the potential influencing factor has on the factor of interest. For each communication node, interfaces are configured between the communication node and other communication nodes based on the determined predictor coefficients. In one embodiment, the factor of interest may be interference at the communication node, received signal power by the communication node, transmission power of the communication node, data rate of reception by the communication node and/or data rate of transmission of the communication node, achievable spectral efficiency, etc. The potential influencing factors may include one of identifier of another communication node, transmission power of another communication node, and/or location of the another communication node.

In one embodiment, the monitoring step generates a table associating the factor of interest for each communication node with the associated plurality of potential influencing factors. The table may be stored centrally, or may be a distributed table.

In one embodiment, the determining step updates the predictor coefficients based on a sliding time window of the table, and the configuring step reconfigures the interfaces based on the updated predictor coefficients.

A still further embodiment includes selecting, for each factor of interest for each communication node, a desired number of the predictor coefficients having highest predicted influence on the factor of interest as a configuration set of the communication node. For each communication node, interfaces are configured between the communication node and other communication nodes associated with the predictor coefficients in each configuration set of the communication node.

In one embodiment, the predictor coefficients are determined by regression analysis.

The communication nodes may include a Femto base station, a pico base station and a macro base station.

The configured interfaces may include an X2 interface.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein:

FIG. 3 illustrates the generic structure for a table of factors of interest and associated potential influencing factors according to an embodiment.

FIG. 4 illustrates a specific example entry in the table having the structure of FIG. 3.

DETAILED DESCRIPTION OF EXAMPLE EMBODIMENTS

Figure 1:
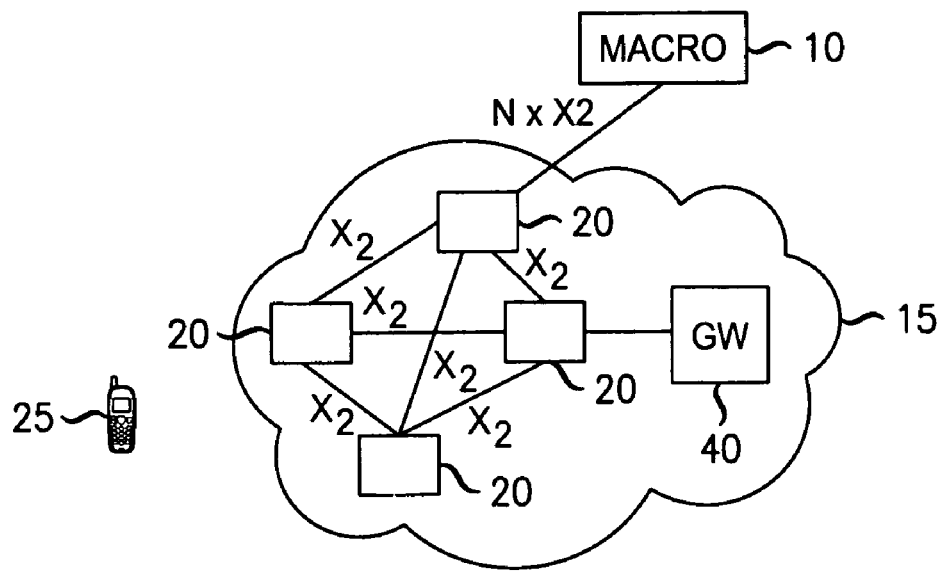
FIG. 1 illustrates a portion of a conventional heterogeneous network (HTN) having multiple stacked cell layers.

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

As used herein, the term "user equipment" may be considered synonymous to, and may hereafter be occasionally referred to, as a mobile, mobile unit, mobile station, mobile user, subscriber, user, remote station, access terminal, receiver, etc., and may describe a remote user of wireless resources in a wireless communication network. The term "base station" may be considered synonymous to and/or referred to as a base transceiver station (BTS), NodeB, extended NodeB, evolved NodeB, femto cell, pico cell, access point, etc. and may describe equipment that provides the radio baseband functions for data and/or voice connectivity between a network and one or more users.

Figure 2:
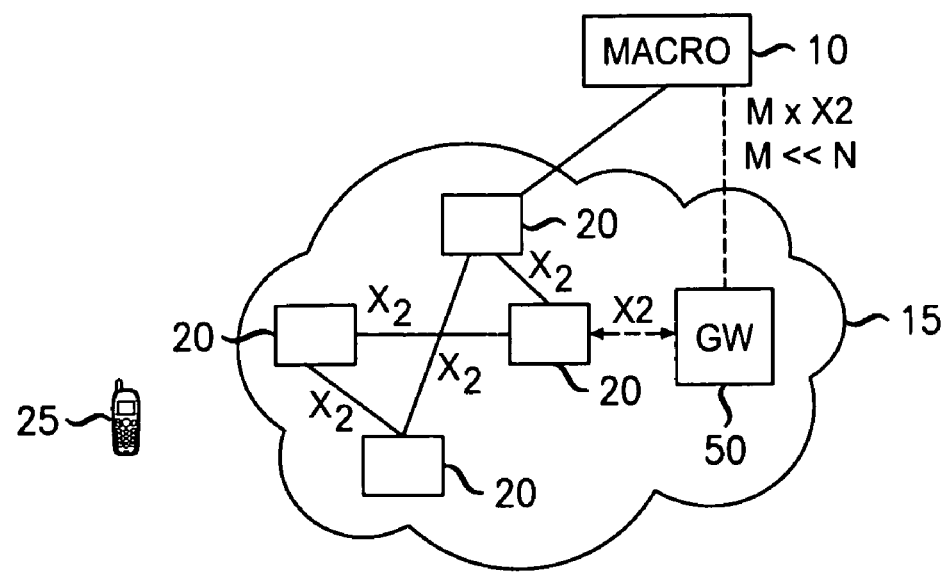
FIG. 2 illustrates a portion of a heterogeneous network (HTN) having multiple stacked cell layers according to an embodiment of the present invention.

FIG. 2 illustrates a portion of a heterogeneous network (HTN) having multiple stacked cell layers according to an embodiment of the present invention. FIG. 2, like FIG. 1, shows the coverage area of a macro cell served by a macro base station 10 also called an evolved nodeB or eNodeB. As shown, the coverage area includes a network 15 of pico cells, each served by a pico base station 20 also called a pico evolved NodeB or pico eNodeB. User equipment (UE) 25 falls within the coverage area of one or more of the pico base stations 20 and therefore the coverage area of the macro base station 10. The communication needs of the UE may be served by one of the communication nodes—pico base stations 20 or macro base station 10. If served by a pico base station 20, the UE's traffic may traverse the pico network 15 (i.e., from pico eNodeB to pico eNodeB) to a local gateway 50, and from the gateway 50 to other networks and/or the internet. Also, the UE's traffic may traverse the pico network 15 to the macro base station 10, and from the macro base station 10 to other networks and/or the internet. Still further, the UE's traffic may flow directly to and from the macro base station 10. As will be appreciated additional and/or different network layers may be present. For example, in addition to or instead of the pico network 15, a Femto network may exist or individual Femto cells may exist.

In the embodiment of FIG. 2, local gateway 50 controls the X2 interfaces established between the pico base stations 20 and between the macro base station 10 and the pico base stations 20. Initially, the gateway 50 instructs configuration of interfaces between the communication nodes (e.g., pico base stations, macro base stations, etc.) in the conventional manner. Namely, intra-layer and inter-layer X2 interfaces are established in the conventional manner. Here, "communications nodes" collectively refers to the nodes (e.g., base stations) in the different layers or networks (e.g., pico network, macro network, etc. or portion thereof).

Next, the gateway 50 monitors, for each communication node, at least one factor of interest and a plurality of potential influencing factors associated with the factor of interest. The factor of interest characterizes an operating condition of the communication node, and the plurality of potential influencing factors each have a potential influence on the operating condition. For example, the factor of interest may be interference at the communication node, received signal power by the communication node, transmission power of the communication node, data rate of reception by the communication node, data rate of transmission of the communication node, achievable spectral efficiency, and/or etc. The potential influencing factors may include identifiers of other communication nodes, transmission power of the other communication nodes, location of the other communication nodes, etc.

As is known, the communication nodes themselves and UEs served by the communication nodes measure and report on these example factors of interest and potential influencing factors to other nodes. For example, these measurements and reports (or messages) are made to support managing interference in the HTN as described in the Background section. As a specific example, the X2 interface supports at least the following messages: UL Interference Overload (UL-IO), UL High Interference Indication (UL-HII), and Relative Narrowband Tx Power (DL-RNTP). The UL-IO message indicates per resource block, the interference level experienced by the sending communication node. The UL-HII message indicates per resource block, the occurrence of high interference sensitivity, as seen from the sending communication node. The DL-RNTP message indicates per resource block, whether the downlink transmission power is lower than the value indicated by an RNTP threshold value. It will be understood that these are just a few example measurements, and that many more and different measurements and associated report messages may be sent depending on the communication nodes, the factors of interest and the potential influencing factors.

The local gateway 50 receives the messages from the communication nodes in the HTN, and accumulates the information in a table. Namely, the above messages are transferred from communication node to communication node to disseminate the information throughout the HTN, and the local gateway receives and accumulates this information as discussed below. FIG. 3 illustrates the generic structure of an example table. As shown, an entry in the table includes the time of the measurements, the factor of interest, and P potential influencing factors. FIG. 4 illustrates a specific entry in an example table based on the generic structure of FIG. 3. As shown, the factor of interest in this entry is interference at communication node W, and the interference measurement was taken at time t1. Here, the communication node W will be the communication node of interest, and may be any of the pico base stations 20, for example. As further shown in FIG. 4, the potential influencing factors include the cell or node identifiers of the node W as well as communication nodes A1 to AN, where communication nodes A1 to AL are all of the communication nodes in the HTN. However, the communication nodes A1 to AL may be less than all of the communication nodes in the HTN. For example, communication nodes A1 to AL may be the communications nodes within a certain distance from communication node W. FIG. 4 further shows that the potential influencing factors may also include the transmit power at each of communication nodes A1 to AL.

As will be appreciated, the local gateway 50 accumulates multiple entries for communication node W over time. As will further be appreciated, the local gateway 50 accumulates multiple entries for the other communication nodes as well. Accordingly, in a short time the table includes hundreds of thousands of entries. Such a large table may be managed centrally; namely stored at the local gateway 50 or a single storage location associated with the local gateway 50. Alternatively, the table may be distributed throughout the HTN. For the purposes of example only, the embodiments will be described assuming the table is centrally stored.

Also, instead of storing entries associated with a single factor of interest for a communication node, entries may include multiple factors of interest. Still further, the factors of interest and the potential influencing factors are not limited to those discussed, but may include any factor a system designer chooses.

Figure 5:
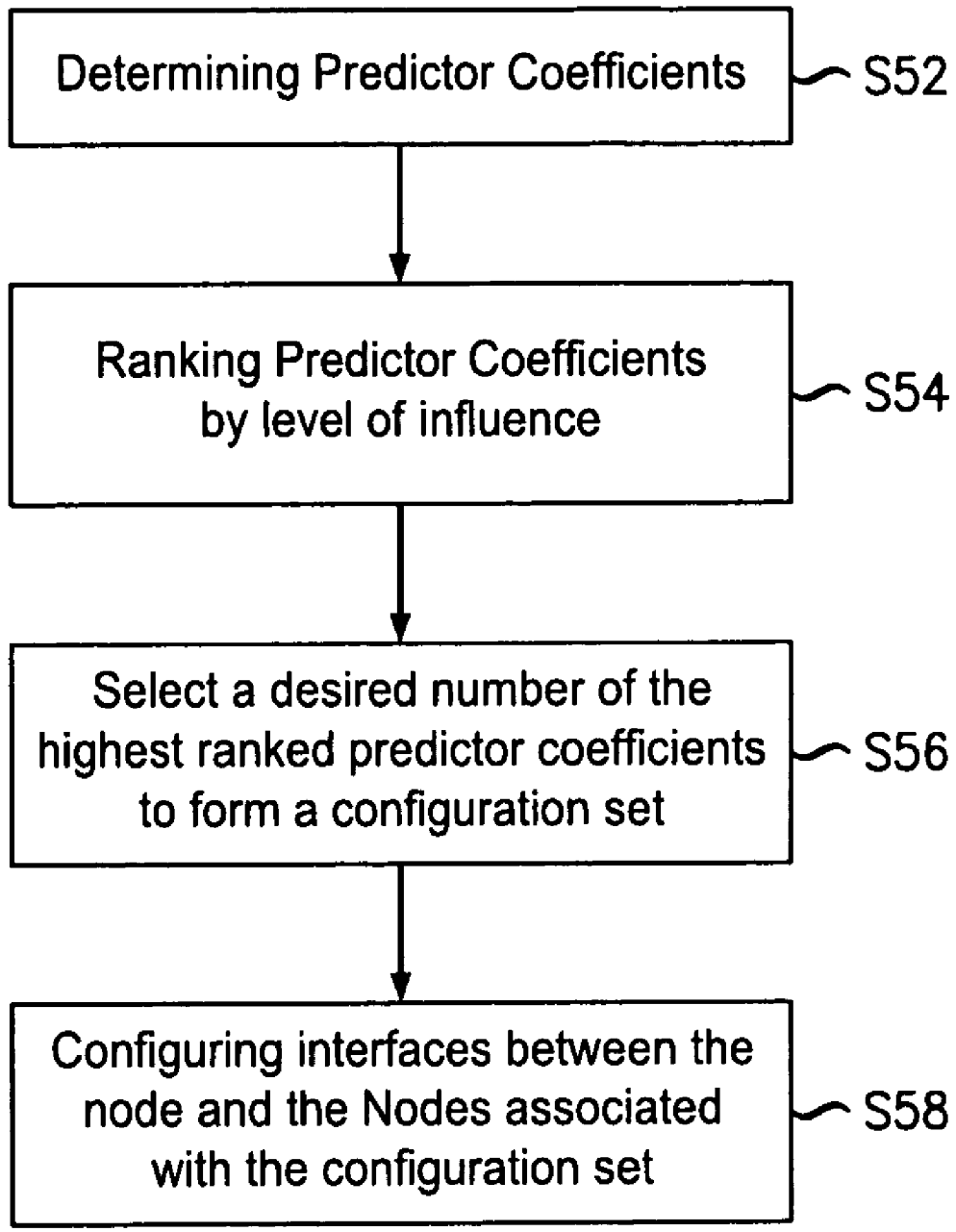
FIG. 5 illustrates a flow chart of a method of configuring interfaces between communication nodes according to an embodiment.

Next, the process by which the local gateway 50 configures the interfaces between the communication nodes will be described. FIG. 5 illustrates a flow chart of a method of configuring interfaces between communication nodes according to an embodiment. In particular, FIG. 5 illustrates the process carried out for each communication node in the HTN. For example, the local gateway 50 carries out the process of FIG. 5 for each pico base station 20 and the macro base station 10 in FIG. 2.

As shown in step S52 the local gateway 50 determines, for each factor of interest for the communication node, a predictor coefficient for one or more of the potential influencing factors associated with the factor of interest based on the table discussed above with respect to FIGS. 3 and 4. A predictor coefficient indicates a predicted level of influence the potential influencing factor has on the factor of interest. The predictor coefficients are determined by performing a regression analysis. For example, The aim is now to come up with a relationship such as, $$y = f(x) + \epsilon \quad (1)$$

where y is the factor of interest, the $f$ function is the regression function that can explain the relationship between predictor coefficients and the potential influencing factors, and $\epsilon$ is an error term that is associated with the factors of the system that cannot be explained. When the regression function is of the form:

$$f(x) = X\beta \quad (2)$$

then we talk about a linear regression model of the predictor coefficients $\beta$. Here X represents a matrix of measurements from the table discussed above with respect to FIGS. 3 and 4. The fitting of this model to the data is simply the estimation of the parameters of the model that are the predictor coefficients $\beta$. Note that the number of entries for just one factor of interest for just one communication node may extend into the many millions over the observation period that may include measurements performed in the network over days, weeks or months. A simple least squares solution can lead to, $$\beta = (XX^T)^{-1} X^T y \quad (3)$$

where X is the measurement matrix whose columns are the measurements of the potential influencing factors considered in the regression analysis and y is measurements of the factor of interest. Namely, as will be appreciated, the measurement matrix X is simply potential influencing factor columns from the table of FIGS. 3 and 4 over a desired period of time, and the factor of interest y is a one column matrix corresponding to the factor of interest in the table of FIGS. 3 and 4 over the same period of time. Not all of the potential influencing factors from the table need to be included in each regression analysis. Depending on the nature of the problem and the factor of interest y, a subset of relevant potential influencing factors may be selected. For example, the communication node to which the process of FIG. 5 is applied will be referred to as the communication node of interest. If the regression problem is localized to cell or node identifier (id), the specific cell identifier of the communication node of interest will be included in the measurement matrix and possibly one or more of the cell identifiers of its neighbors. The cells identifiers of communication nodes far from the communication node of interest are most likely irrelevant to the problem, and therefore those columns in the table of FIGS. 3 and 4 may be excluded in forming the measurement matrix.

In addition, the measurements in the table may be preprocessed. For example, outliers may be deleted from the measurement matrix so that the model does not fit such corner cases. Another preprocessing of the data matrix X is imputation. This may be performed because the data matrix is sparse and censored. Many measurements that are reported by the UEs are event-based (i.e., the measurements are triggered by events that are usually affiliated with inadequate coverage conditions, handover triggers, etc.). These are usually observed at the edges of the cells. There is therefore spatial sparseness and also temporal sparseness. When there are no measurements the elements of the measurement matrix and table are represented by a "NA" (not available). Note that we cannot simply replace the missing "NA" elements with 0 (or a lower bound in that matter) as this will lead to erroneous results in any processing such as regression.

As will be appreciated from equation (3) above, a predictor coefficient for each potential influencing factor included in the measurement matrix is generated. The resulting predictor coefficients $\beta$'s are a good indication of the impact that the corresponding potential influencing factor has on the factor of interest if the potential influencing factors are independent. In most real cases they are not. Correlations may be induced because of the presence of resource control algorithms where, for example, transmission power levels of a cell are made to have a relationship with transmission power levels of a nearby cell such that they minimize mutual interference.

As shown in FIG. 5, in step S54, the resulting predictor coefficients are ranked highest to lowest. The higher the predictor coefficient, the greater the influence the associated potential influencing factor has on the factor of interest. Then, a number of the highest predictor coefficients are selected to form a configuration set in step S56. For example, the three highest predictor coefficients may be selected, and the potential influencing factors associated with the selected predictor coefficients from the configuration set. Other forms of ranking can also be performed. In one embodiment the predictor coefficient $\beta 1$ dominates predictor coefficient $\beta 2$ when their corresponding sampling distributions have a similar stochastic dominance relationship.

Then, in step S58, the local gateway 50 instructs the communication node of interest to establish interfaces with the communication nodes associated with the configuration set. For example, with reference to FIG. 4, assume the configuration set included the cell identifiers of communication nodes A1, A5 and A10. In step S58, the local gateway 50 instructs communication node W to form interfaces with communication nodes A1, A5 and A10. To the extent communication node W had interfaces with other communication nodes, these interfaces are torn down and eliminated unless the process of FIG. 5 run for those other communication nodes results in setting up interfaces with the communication node W. Namely, only interfaces with communication nodes in the configuration set remain. As a result, the method of FIG. 5 may reduce the number of interfaces. This has been graphically shown in FIG. 2, where X2 interfaces do not exist between some of the pico base stations 20.

It will be appreciated, that the local gateway 50 may apply the configuration process of FIG. 5 in parallel for two or more communication nodes. Still further, it will be appreciated that the configuration process of FIG. 5 may be performed periodically where the measurement matrix is formed from a sliding time window of the table discussed above with respect to FIGS. 3 and 4. In this manner, the interfaces may be dynamically configured, and change over time to accommodate changes in the HTN and operating conditions of the HTN.

As a further option, the local gateway 50 may serve as a proxy for interfacing between layers. With respect to FIG. 2, for example, the local gateway 50 may serve as the proxy for the pico base stations 20. As such, the X2 interfaces between the pico base stations 20 and the macro base station 10 may be eliminated or reduced. Instead, the pico base stations 20 establish X2 interfaces with the local gateway 50 as shown in FIG. 2. The local gateway 50 then establishes X2 interfaces with the macro base station 10. Assuming the number of X2 interfaces conventionally established between the pico base stations 20 and the macro base station 10 is N, this number of X2 interfaces may be established between the pico base stations 20 and the local gateway 50. However, the number of X2 interfaces established between the local gateway 50 and the macro base station 10 may be a much smaller number M, as shown in FIG. 2.

The invention being thus described, it will be obvious that the same may be varied in many ways. Such variations are not to be regarded as a departure from the invention, and all such modifications are intended to be included within the scope of the invention.

What is claimed:

1. A method of configuring interfaces between a plurality of communication nodes, comprising:
   monitoring, for each communication node, at least one factor of interest and a plurality of potential influencing factors associated with the factor of interest, the factor of interest characterizing an operating condition of the communication node, and the plurality of potential influencing factors each having a potential influence on the operating condition;
   determining, for each factor of interest for each communication node, a predictor coefficient for one or more of the potential influencing factors associated with the factor of interest, the predictor coefficient indicating a predicted level of influence the potential influencing factor has on the factor of interest; and
   establishing, for each communication node, interfaces between the communication node and other communication nodes based on the determined predictor coefficients.

2. The method of claim 1, wherein the factor of interest is one of interference at the communication node, received signal power by the communication node, transmission power of the communication node, data rate of reception by the communication node and data rate of transmission of the communication node.

3. The method of claim 2, wherein the potential influencing factors include one of identifier of another communication node, transmission power of the another communication node, and location of the another communication node.

4. The method of claim 1, wherein the potential influencing factors include one of identifier of another communication node, transmission power of the another communication node, and location of the another communication node.

5. The method of claim 1, wherein the monitoring step generates a table associating the factor of interest for each communication node with the associated plurality of potential influencing factors.

6. The method of claim 5, wherein the monitoring step adds to the table based on measurements received from the communication nodes and user equipment served by the communication nodes.

7. The method of claim 5, wherein the table is centralized.

8. The method of claim 5, wherein the table is distributed.

9. The method of claim 5, wherein
   the determining step updates the predictor coefficients based on a sliding time window of the table; and
   the establishing step establishes the interfaces based on the updated predictor coefficients.

10. The method of claim 9, further comprising:
    selecting, for each factor of interest for each communication node, a desired number of the predictor coefficients having highest predicted influence on the factor of interest as a configuration set of the communication node; and
    establishing, for each communication node, interfaces between the communication node and other communication nodes associated with the predictor coefficients in each configuration set of the communication node.

11. The method of claim 10, wherein the, determining step determines the predictor coefficients by regression analysis.

12. The method of claim 1, further comprising:
    selecting, for each factor of interest for each communication node, a desired number of the predictor coefficients having highest predicted influence on the factor of interest as a configuration set of the communication node; and
    establishing, for each communication node, interfaces between the communication node and other communication nodes associated with the predictor coefficients in each configuration set of the communication node.

13. The method of claim 12, wherein the determining step determines the predictor coefficients by regression analysis.

14. The method of claim 1, wherein the determining step determines the predictor coefficients by regression analysis.

15. The method of claim 1, wherein the regression analysis is a least squares analysis.

16. The method of claim 1, wherein the communication nodes include at least one of a Femto base station, a pico base station and a macro base station.

17. The method of claim 16, wherein the established interfaces include an X2 interface.

* * * * *